US010803736B1

(12) United States Patent
Chang

(10) Patent No.: US 10,803,736 B1
(45) Date of Patent: Oct. 13, 2020

(54) EXTERNAL SMART DEVICE FOR A CEILING FAN RECEIVING BOX

(71) Applicant: Rhine Electronic Co., Ltd., Taichung (TW)

(72) Inventor: Yi-Kai Chang, Taichung (TW)

(73) Assignee: RHINE ELECTRONIC CO., LTD., Taichung (TW)

( * ) Notice: Subject to any disclaimer, the term of this patent is extended or adjusted under 35 U.S.C. 154(b) by 0 days.

(21) Appl. No.: 16/390,941

(22) Filed: Apr. 22, 2019

(30) Foreign Application Priority Data

Mar. 28, 2019 (TW) .............................. 108203847 U

(51) Int. Cl.
G08C 17/02 (2006.01)
F04D 25/08 (2006.01)
F04D 27/00 (2006.01)

(52) U.S. Cl.
CPC ........... *G08C 17/02* (2013.01); *F04D 25/088* (2013.01); *F04D 27/004* (2013.01); *F04D 27/008* (2013.01); *H04M 2250/02* (2013.01)

(58) Field of Classification Search
CPC ..... G08C 17/02; F04D 25/088; F04D 27/004; F04D 27/008
USPC .......................................................... 318/16
See application file for complete search history.

(56) References Cited

U.S. PATENT DOCUMENTS

| 5,738,496 A * | 4/1998 | Mehta | F04D 25/088 340/12.22 |
|---|---|---|---|
| 9,394,919 B1 * | 7/2016 | Byrne | F04D 29/646 |
| 9,414,142 B1 * | 8/2016 | Zauhar | H04R 1/025 |
| 9,901,039 B1 * | 2/2018 | Dellerson | F21V 23/0435 |
| 10,415,575 B2 * | 9/2019 | Horng | F04D 29/601 |
| 2010/0314941 A1 * | 12/2010 | Schulzman | F04D 25/068 307/40 |
| 2012/0194112 A1 * | 8/2012 | Purohit | H02K 29/08 318/400.32 |
| 2014/0304431 A1 * | 10/2014 | Onohara | H04W 4/48 710/12 |
| 2015/0147188 A1 * | 5/2015 | Danielsson | F04D 25/0613 417/14 |
| 2016/0181875 A1 * | 6/2016 | Long | H02J 50/90 320/108 |
| 2017/0125875 A1 * | 5/2017 | Courtney | H01Q 1/06 |
| 2017/0204869 A1 * | 7/2017 | Horng | F04D 25/0693 |
| 2018/0115131 A1 * | 4/2018 | Kohen | H01R 13/6683 |
| 2018/0206305 A1 * | 7/2018 | Van Winkle | F21V 15/01 |
| 2019/0301689 A1 * | 10/2019 | Hetrick | F21S 2/005 |
| 2019/0309761 A1 * | 10/2019 | Wang | F04D 25/088 |
| 2020/0018469 A1 * | 1/2020 | Kohen | H05B 47/19 |

FOREIGN PATENT DOCUMENTS

WO WO-2018165058 A1 * 9/2018 .............. F21V 21/03

* cited by examiner

*Primary Examiner* — Kawing Chan
(74) *Attorney, Agent, or Firm* — Sinorica, LLC

(57) ABSTRACT

An external smart device for a ceiling fan receiving box comprises a wireless control receiving box body and a ceiling fan control receiving box body, which are of selectable in assembly and disassembly, so as to provide users with the choices of their selections. It reduces costs of production and purchase. When some component fails, it can be individually replaced, reducing material waste and generation in an environment-friendly way. It also reduces the costs for component replacements. Thus, it achieves the effects of low costs of purchase and replacements and being environment-friendly.

2 Claims, 6 Drawing Sheets

EXTERNAL SMART DEVICE FOR A CEILING FAN RECEIVING BOX

FIELD OF THE INVENTION

The invention relates to an external smart device for a ceiling fan receiving box and, in particular, to a ceiling fan wireless control device of selectable in assembly and disassembly.

BACKGROUND OF THE INVENTION

A conventional ceiling fan control receiving box body 10, as shown in FIG. 6, is mounted on the hanger body 31 of the ceiling fan hanger set 30. The ceiling fan control receiving box body 10 and the hanger body 31 are further disposed in the hanging bell body 32. Inside the ceiling fan control receiving body 10 is provided with an RF control module and a wireless control module (not shown). The user uses a remote control or mobile phone to do remote control on the RF control module or the wireless control module in the receiving box 10. However, as the RF control module and the wireless control module are arranged in the ceiling fan control receiving box 10 without any choices. This results in higher costs in production and purchase. Moreover, it cannot satisfy user's choices according to needs. When either of the RF control module and the wireless control module disposed in the ceiling fan control receiving box 10 fails, the entire ceiling fan control receiving box 10 must be replaced altogether, instead of each component individually. This is not environment-friendly, and the cost of replacement is higher. It is necessary to search for improvements.

SUMMARY OF THE INVENTION

This invention is inspired by the fact that the conventional ceiling fan receiving box has high costs of purchase and replacement and is not environment-friendly.

An objective of the invention is to provide an external smart device for a ceiling fan receiving box, which comprises a wireless control receiving box body and a ceiling fan control receiving box body. The wireless control receiving box body has an upper box body and a lower box body. The upper box body and the lower box body are fixedly coupled to each other. A positioning joint hole is provided on an end side of the upper box body, and is provided with a positioning joint element. The outer side of the lower box body is provided with an engaging surface part, which is provided with a contact opening. An end side of the engaging surface part is provided with a plurality of positioning protrusions. A wireless receiving control circuit board is disposed in the upper box body and the lower box body. The wireless receiving control circuit board is provided with a Bluetooth wireless remote control module or a Wi-Fi wireless network remote control module. The wireless receiving control circuit board is provided with a contact terminal, which corresponds to the contact opening provided on the engaging surface part. The ceiling fan control receiving box body is provided with a box body, the outer side of which is provided with a positioning engaging surface part. The other side of the box body is provided with a joint hole groove. The positioning engaging surface part is provided with a lead opening and a plurality of positioning holes. Inside the box body is provided with an RF control circuit board and a buzzer, which are electrically connected with each other. The RF control circuit board is provided with a lead terminal, which corresponds to the positioning engaging surface part of the box body. The lead opening and the engaging surface part provided on the lower box body of the wireless control receiving box body correspond to the positioning engaging surface part provided on the boxy body of the ceiling fan control receiving box body. The positioning protrusions on the engaging surface part are inserted and fixed into the positioning holes on the positioning engaging surface part. The positioning joint hole on the end side of the upper box body is combined with the joint hole groove on the box body and is fixed by the positioning joint element. The contact opening on the engaging surface part is opposite to the lead opening on the positioning engaging surface part, so that the contact terminal disposed on the wireless control receiving circuit board inside the wireless control receiving box body is in electrical connection with the lead terminal on the RF control circuit board in the ceiling fan control receiving box. With the selection of assembly and disassembly between the wireless control receiving box and the ceiling fan control box body, they are combined into a ceiling fan hanger set that contains a hanger set and a is provided with a hanger body and a hanging bell body. The assembled wireless control receiving box body and the ceiling fan control receiving box body are combined into the hanger body and housed in the hanging bell body. When the wireless control receiving box body and the ceiling fan control receiving box body are assembled, the RF control circuit board inside the ceiling fan control receiving box body controls the buzzer to send a warning sound about connection. The user uses a remote control or mobile phone to perform remote control of the receiving box body and the wireless control receiving box body. The user can selectively use the wireless control receiving box body alone or in company with the ceiling fan control receiving box body. The design of separate independent components can effectively reduce the costs of production and purchase. When the wireless control receiving box body or the ceiling fan control receiving box body fails, one can replace the component individually. This greatly reduces the waste of raw materials and the generation of wastes for environmental protection. Moreover, it reduces the cost of component replacements. As a result, it achieves the effects of low costs of purchase and replacements and being environment-friendly.

DESCRIPTION OF THE PREFERRED EMBODIMENTS

The aforementioned and other objectives and advantages of this disclosure will become clearer in light of the following detailed description of an illustrative embodiment of this invention described in connection with the drawings.

Figure 1:
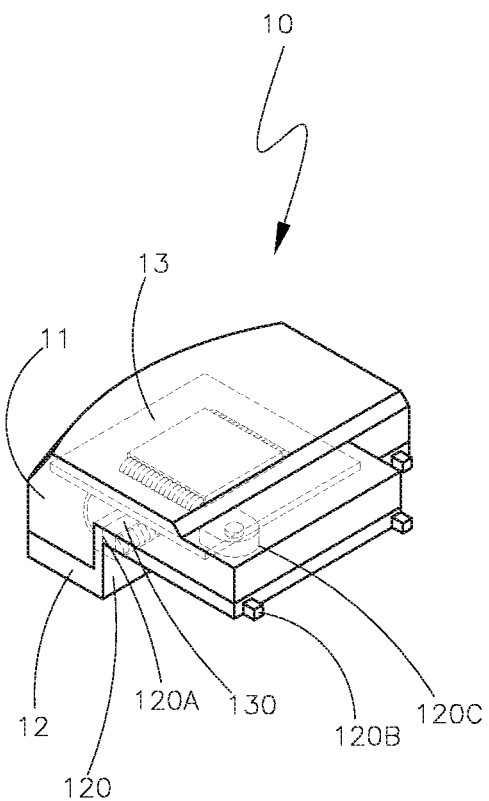
FIG. 1 is a schematic diagram showing the three-dimensional assembly of the external smart device for the ceiling fan receiving box.
Figure 2:
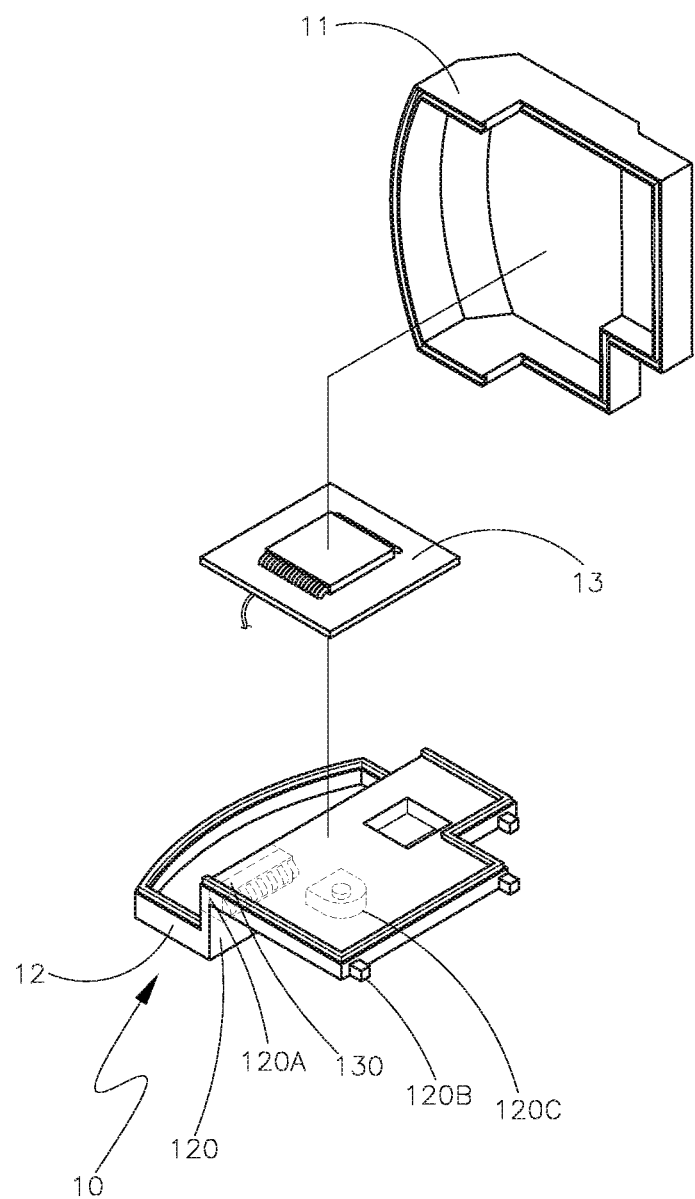
FIG. 2 is a schematic diagram showing the three-dimensional exploded view of the external smart device for the ceiling fan receiving box.
Figure 3:
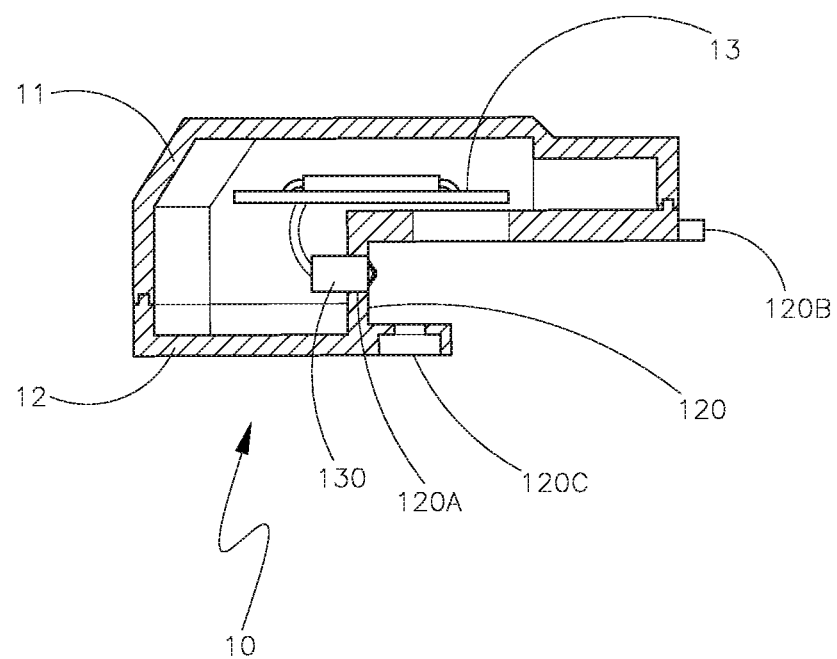
FIG. 3 is a schematic side view showing the external smart device for the ceiling fan receiving box.
Figure 4:
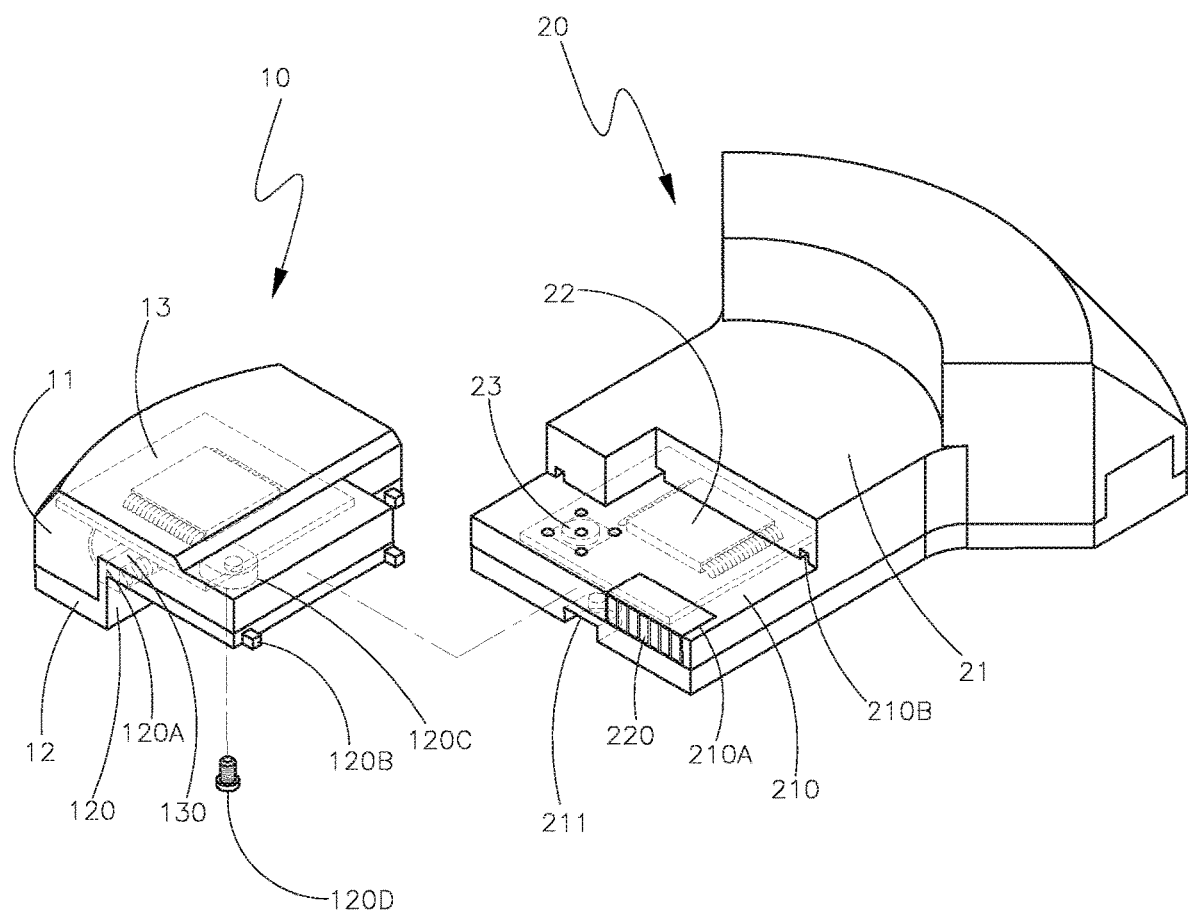
FIG. 4 shows an embodiment of the disclosed external smart device for the ceiling fan receiving box in combination with a ceiling fan control receiving box body.
Figure 5:
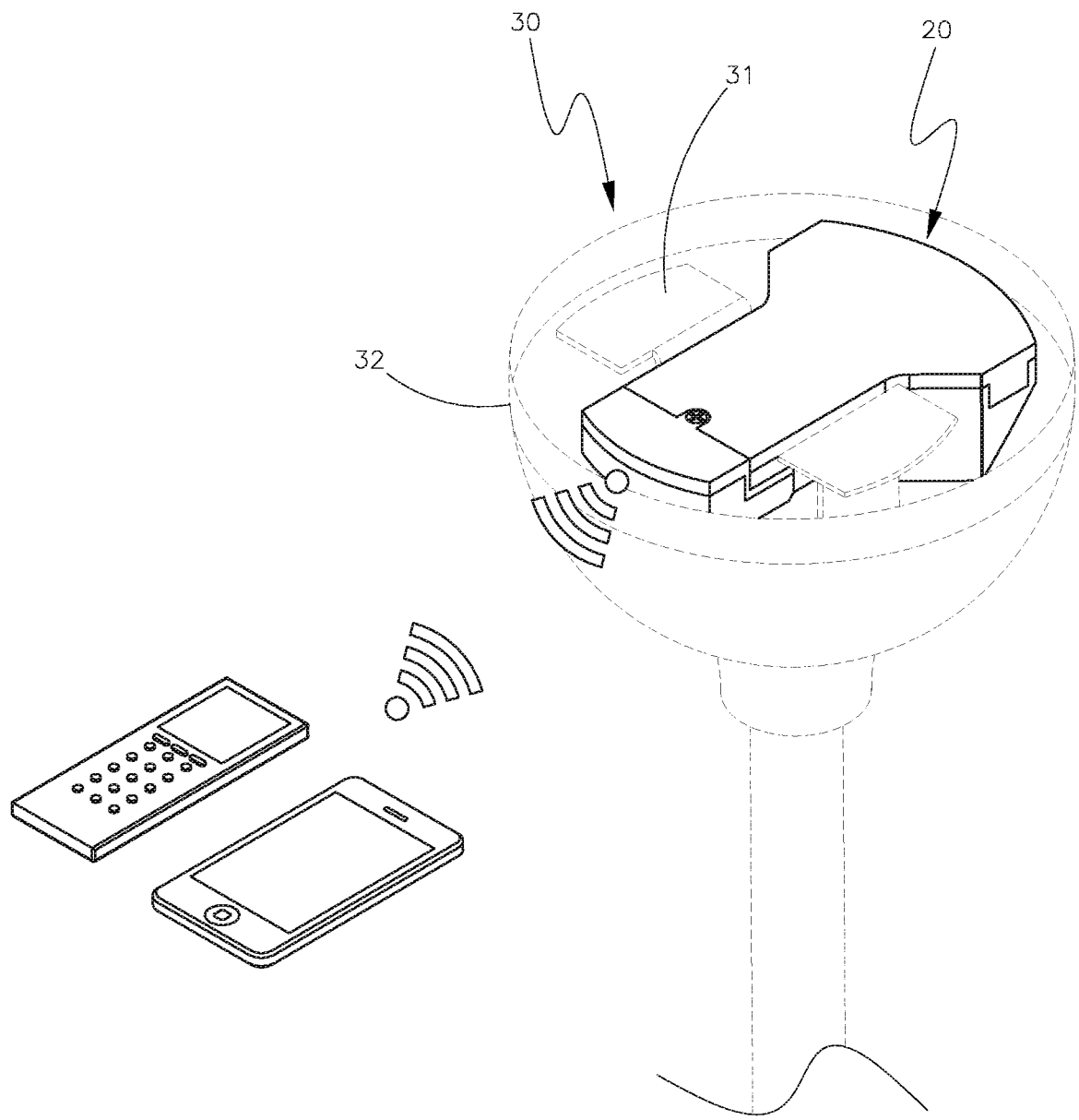
FIG. 5 shows an embodiment of the disclosed external smart device for the ceiling fan receiving box used in the ceiling fan hanger set.
Figure 6:
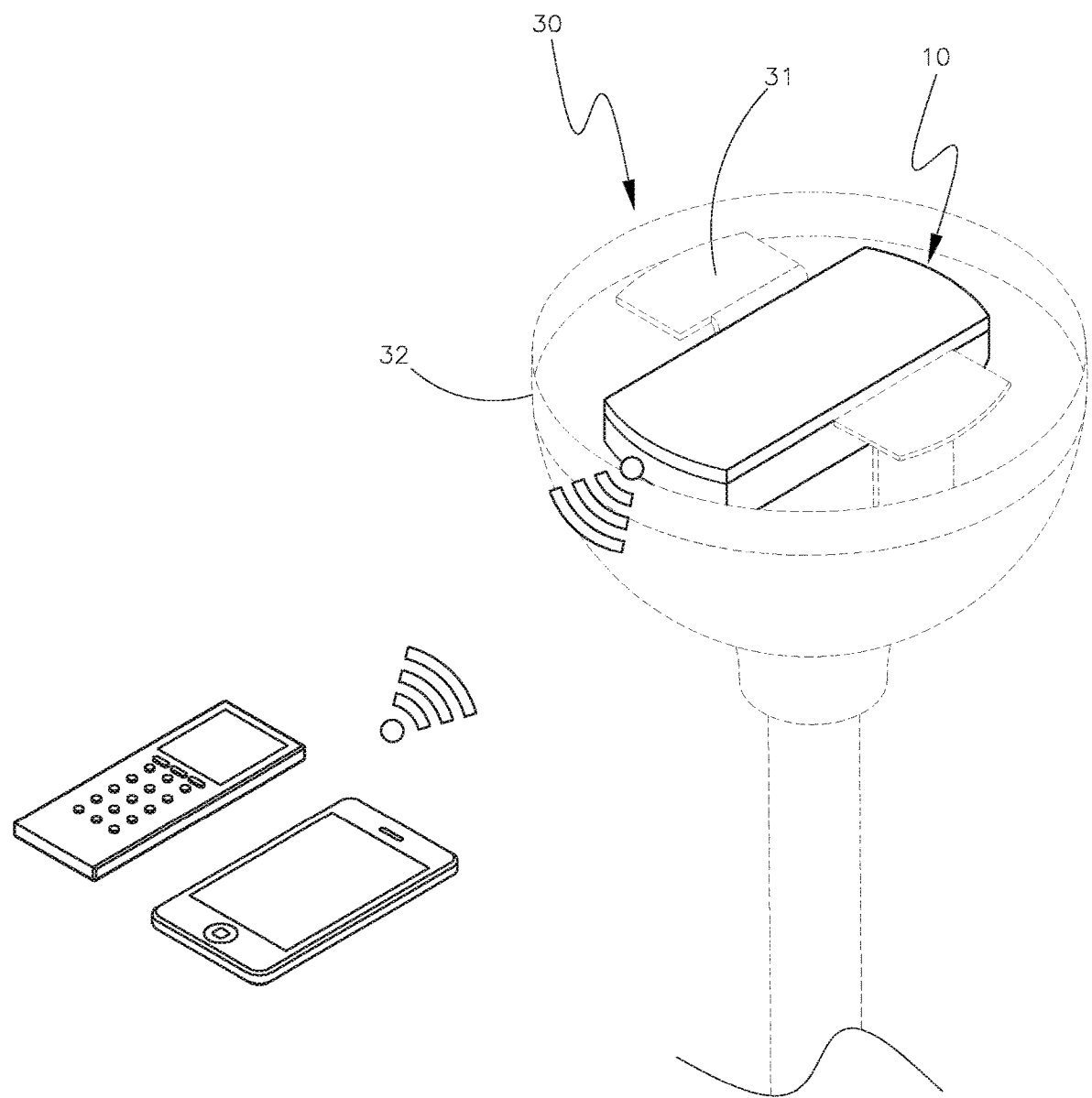
FIG. 6 shows a conventional ceiling fan hanger set mounted with a ceiling fan control receiving box body.

Please refer to FIGS. 1 to 3 for a three-dimensional assembly view, a three-dimensional exploded view, and a side cross-sectional view of the disclosed external smart device for a ceiling fan receiving box, respectively. Connected to a ceiling fan control receiving box body 20, the external smart device comprises: a wireless control receiving box body 10 composed of an upper box body 11 and a lower box body 12. The upper box body 11 and the lower box body 12 are connected and fixed together. The outer side of the lower box body 12 is provided with an engaging surface part 120 having a contact opening 120A. Inside the upper box body 11 and the lower box body 12 is provided with a wireless receiving control circuit board 13, which has a Bluetooth wireless remote control module or Wi-Fi wireless network remote control module (not shown). The wireless receiving control circuit board 13 is provided with a contact terminal 130 corresponding to the contact opening 120A provided on the engaging surface part 120 of the lower box body 12.

With the above-mentioned structure, the disclosed external smart device for a ceiling fan receiving box is formed.

Please refer to FIGS. 2 to 5 for respectively a three-dimensional exploded view of the invention, a side cross-sectional view of the invention, an embodiment of the invention in combination with a ceiling fan control receiving box body, and an embodiment of the invention used in a ceiling fan hanger set. The invention is further provided with a ceiling control receiving box body 20 having a box body 21. The outer side of the box body 21 is provided with a positioning engaging surface part 210. The other side of the box body 21 is provided with a joint hole groove 211. The positioning engaging surface part 210 is provided with a lead opening 210A and a plurality of positioning holes 210B. An RF control circuit board 22 and a buzzer 23, being electrically connected with each other, are disposed inside the box body 21. The RF control circuit board 22 is provided with a lead terminal 220 corresponding to the lead opening 210A of the positioning engaging surface part 210 of the box body 21. An end side of the lower box body 12 of the wireless control receiving box body 10 is provided with a positioning joint hole 120C having a positioning joint element 120D. An end side of the engaging surface part 120 of the lower box body 12 is provided with a plurality of positioning protrusions 120B. The engaging surface part 120 on the lower box body 12 of the wireless control receiving box body 10 are connected correspondingly with the positioning engaging surface part 210 on the box body 21 of the ceiling control receiving box body 20. The positioning protrusions 120B on the engaging surface part 120 are inserted and fixed into the positioning holes 210B on the positioning engaging surface part 210. The positioning joint hole 120C on the end side of the upper box body 11 is connected to the joint hole groove 211 on the box body 21, and is fixed by the positioning joint element 120D. The contact opening 120A on the engaging surface part 120 is opposite to the lead opening 210A of the positioning engaging surface part 210, so that the contact terminal 130 on the wireless receiving control circuit board 13 in the wireless control receiving box body 10 is in electrical contact with the lead terminal 220 on the RF control circuit board 22 in the ceiling fan control receiving box body 20. With the wireless control receiving box body 10 and the ceiling fan control receiving box body 20 being selectable in assembly or disassembly, the invention is connected to a ceiling fan hanger set 30 having a hanger body 31 and a hanging bell body 32.

The wireless control receiving box body 10 and the ceiling fan control receiving box body 20 assembled together is connected to the hanger body 31 and housed inside the hanging bell body 32. Once the wireless control receiving box body 10 and the ceiling fan control receiving box body 20 are connected, the RF control circuit board 22 inside the ceiling fan control box body 20 controls the buzzer 23 to make an alarm sound of connection. The user uses a remote control or mobile phone to make remote control of the ceiling fan control receiving box body 20 and the wireless control receiving box body 10. The user can selectively use the wireless control receiving box body 10 alone or in company with the ceiling fan control receiving box body 20. The design of separate independent components can effectively reduce the costs of production and purchase. When the wireless control receiving box body 10 or the ceiling fan control receiving box body 20 fails, one can replace the component individually. This greatly reduces the waste of raw materials and the generation of wastes for environmental protection. Moreover, it reduces the cost of component replacements. As a result, it achieves the effects of low costs of purchase and replacements and being environment-friendly.

While the invention is described in some detail hereinbelow with reference to certain illustrated embodiments, it is to be understood that there is no intent to limit it to those embodiments. On the contrary, the aim is to cover all modifications, alternatives and equivalents falling within the spirit and scope of the invention as defined by the appended claims.

What is claimed is:

1. An external smart device mounted on a hanging body of a ceiling fan for controlling the ceiling fan comprising:
    a wireless control receiving box body having an upper box body and a lower box body connected and fixed together, wherein the outer side of the lower box body has an engaging surface part provided with a contact opening, a wireless receiving control circuit board is provided inside the upper box body and the lower box body, and the wireless receiving control circuit board is provided with a contact terminal corresponding to the contact opening on the engaging surface part of the lower box body;
    a ceiling fan control receiving box body having a box body whose outer side is provided with a positioning engaging surface part having a lead opening, wherein an RF control circuit board is disposed in the box body and is provided with a lead terminal corresponding to the lead opening on the positioning engaging surface part of the box body, the engaging surface part on the lower box body of the wireless control receiving box is connected to the positioning engaging surface part on the box body of the ceiling fan control receiving box body with the contact opening of the engaging surface part opposite to the lead opening of the positioning engaging surface part, so that the contact terminal of the wireless receiving control circuit board inside the wireless control receiving box body is electrically connect with the lead terminal on the RF control circuit board inside the ceiling fan control receiving box body;
    a buzzer is disposed in the ceiling fan control receiving box body and electrically connected to the RF control circuit board, the RF control circuit board controls the buzzer to make an alarm sound for connection after the wireless control receiving box body and the ceiling fan control receiving box body are connectedly assembled;

one end side of the upper box body of the wireless control receiving box body is provided with a positioning joint hole with a positioning joint element, the other side of the box body of the ceiling fan control receiving box body is provided with a joint hole groove, and the positioning joint hole on the end side of the upper box body and the joint hole groove on the box body are engaged and fixed using the positioning joint element when the engaging surface part on the lower box body of the wireless control receiving box body and the positioning engaging surface part on the box body of the ceiling fan control receiving box body are correspondingly connected; and an end side of the engaging surface part on the lower box body of the wireless control receiving box body is provided with a plurality of positioning protrusions and the positioning engaging surface part on the box body of the ceiling fan control receiving box body is provided with a plurality of positioning holes, so that the positioning protrusions on the engaging surface part are inserted and fixed onto the positioning holes on the positioning engaging surface part when the engaging surface part on the lower box body of the wireless control receiving box body and the positioning engaging surface on the box body of the ceiling fan control receiving box body are correspondingly connected.

2. The external smart device for a ceiling fan receiving box of claim 1, wherein the wireless receiving control circuit board has a Bluetooth wireless remote control module or Wi-Fi wireless network remote control module.

* * * * *